United States Patent [19]

Ten Vaarwerk

[11] Patent Number: 5,330,347
[45] Date of Patent: Jul. 19, 1994

[54] MOULDING PRESS FOR AN INJECTION MOULDING DEVICE

[75] Inventor: Gerardus J. M. Ten Vaarwerk, Beek, Netherlands

[73] Assignee: AMCO Holding B.V., Netherlands

[21] Appl. No.: 950,822

[22] Filed: Sep. 24, 1992

[30] Foreign Application Priority Data

Sep. 24, 1991 [NL] Netherlands .................. 9101617

[51] Int. Cl.⁵ .................................... B29C 35/00
[52] U.S. Cl. ................................ 425/406; 425/409; 425/451.4; 425/451.6; 425/DIG. 5
[58] Field of Search ............... 425/451.4, 451.5, 451.6, 425/DIG.5, 406, 409

[56] References Cited

U.S. PATENT DOCUMENTS

| | | | |
|---|---|---|---|
| 2,269,758 | 1/1942 | de Noronha | 425/167 |
| 3,830,614 | 8/1974 | Kurtz | 425/242 |
| 4,776,783 | 10/1988 | Pelle et al. | 425/190 |
| 5,069,613 | 12/1991 | Inaba et al. | 425/451.4 |
| 5,104,308 | 4/1992 | Morton et al. | 425/451.4 |

FOREIGN PATENT DOCUMENTS 2252953  5/1974  Fed. Rep. of Germany .

*Primary Examiner*—Tim Heitbrink
*Attorney, Agent, or Firm*—Webb Ziesenheim Bruening Logsdon Orkin & Hanson

[57] ABSTRACT

A moulding press for a moulding device which comprises two mould halves movable relative to each other. The mould halves are connected by a pair of spaced joint linkages located opposite one another. Each joint linkage includes two pivotable arms which are connected in a hinge-like manner to each other and to a respective first and second plate. Control arms engage the joint linkages and are movably coupled to a control element. Movement of the control element will result in link motion of the control arms and cause movement of the mould halves toward each other or away from each other.

16 Claims, 7 Drawing Sheets

MOULDING PRESS FOR AN INJECTION MOULDING DEVICE

BACKGROUND OF THE INVENTION

The present invention relates to a moulding press for a transfer- or injection-moulding machine, comprising two mould halves which can be moved relative to each other, in which the connection between said mould halves comprises joint lever means consisting of two arms which are connected in a hinge-like manner to each other, the free ends of which are connected in a hinge-like manner to the upper and lower mould halves and in which a control arm engages on the hinge point of the arms, the other end of which control arm engages on a cam track of a cam disc, the cam disc being mounted rotatably on the frame of the moulding press.

Such a moulding press is disclosed in the German Offenlegungsschrift 2,252,953. In this moulding press, a joint lever means is present and the cam disc is provided with a closed track. To prevent movement of the end of the control arm which engages on the cam track, said arm is connected in a hinge-like manner to a rod which is connected to the frame of the device. There is a horizontal guiding for the control arm, which guiding permits a deflection with respect to the horizontal position with the aid of a spring construction.

If relatively large forces, such as occur, for example, in transfer- or injection-moulding devices, have to be transmitted by means of such a device, a construction of this kind becomes very inefficient. After all, the cam disc is subjected to a high one-sided load and therefore the disc will have to be of a correspondingly robust design. This means that a relatively large drive will have to be installed adjacent to the transfer- or injection-moulding device. In addition, the various arms of the construction will have to be of a correspondingly robust design.

The object of the present invention is to provide a control mechanism for the above mentioned moulding press, which does not have these disadvantages.

SUMMARY OF THE INVENTION

This object is achieved in a moulding device described above in that there are two spaced-apart joint lever means, between which the cam disc is fitted, and in that, moreover, the control arms, with the end that engages on the cam track, engage on a linear guiding, which guiding extends essentially perpendicularly to the direction of movement of the mould halves.

By designing the joint lever means in duplicate, they can each have a lighter structure while a considerable force can still be applied. By using two joint lever means, the forces which are consequently generated and which do not relate to the opening or closing are compensated for. The use of a linear guiding for the control arms is necessary to enable a cam track to be produced in a simple way. When the cam disc rotates and the engagement point of the control arms is applied to both sides with respect to the core, the inclination of the cam track at the application point of the control arm will be in the opposite direction. By mounting the cam disc between the joint lever means, it can be integrated into the moulding press. An equal distribution of the load on the cam disc is achieved, as a result of which it can be designed so as to be relatively small so that the constructional height of the moulding press is unaffected, or hardly affected.

It is noted that the U.S. Pat. Nos. 3,830,614 and 2,269,758 disclose drives for a moulding press in which use is made of a crank gear in place of a cam disc. With these, it is not possible to control the opening and closing of the moulding press as required, which is, however, the case with a cam track. U.S. Pat. No. 4,776,783 discloses a joint lever mechanism which does not use a cam disc.

In the device according to German Offenlegungsschrift 2,252,953 both mould halves have to be mounted so as to be movable with respect to the frame by means of a coupling between control arm and frame. Said coupling is not present in the invention and therefore a mould may be connected to the frame.

The invention is based on the idea that a relatively small force and relatively large travel are required so that the control arm can apply a relatively small travel and large force on the mould halves. By means of the rotating disc it is possible in a simple manner to make the control arm perform a controlled movement. In this case, the rotating disc is in particular a cam disc. By adjusting the shape of the cam track, the movement of the control arm can be controlled and thus the closing and opening movement of the mould halves can be controlled. Guiding means may additionally be present to further guide the end of the control arm which engages on the cam disc, which guiding means ensure as far as possible that the control arm moves perpendicularly relative to the movement of the mould. An optimum simple construction is achieved if the control arm is connected to the hinge point of the arms of the joint lever means.

By means of the abovementioned construction it is possible, starting from an open position, to perform the closing movement initially relatively quickly, followed by slower movement in order thereby to be able to insert the product to be encapsulated, such as an integrated circuit in a chip housing, accurately into the mould halves in a controlled manner.

In this case, it is, of course, important that, when the mould is completely closed, the control element can absorb the force exerted by the transfer part of the device. According to a very efficient embodiment in terms of dimension and construction, the control means are placed in a position lying below the mould means and the lower mould is securely connected to the surroundings.

The invention also relates to a method for controlling the moulding press, comprising moving the mould halves with a relatively small force from the open position towards each other, measuring the distance between the mould halves after the closing movement has finished and applying a greater force on the mould halves if the measured distance is within a certain range. The application of a greater force may be controlled by means of a closed-loop control. To apply the force, use is made, for example, of a motor which can generate a considerable torque in the idling state, depending on the power supplied to it. This power is in turn dependent on the pressure measured in the mould halves.

BRIEF DESCRIPTION OF THE DRAWINGS

The invention will be described in more detail below by means of an exemplary embodiment illustrated in the drawing, in which.

DESCRIPTION OF THE PREFERRED EMBODIMENT

Figure 1:
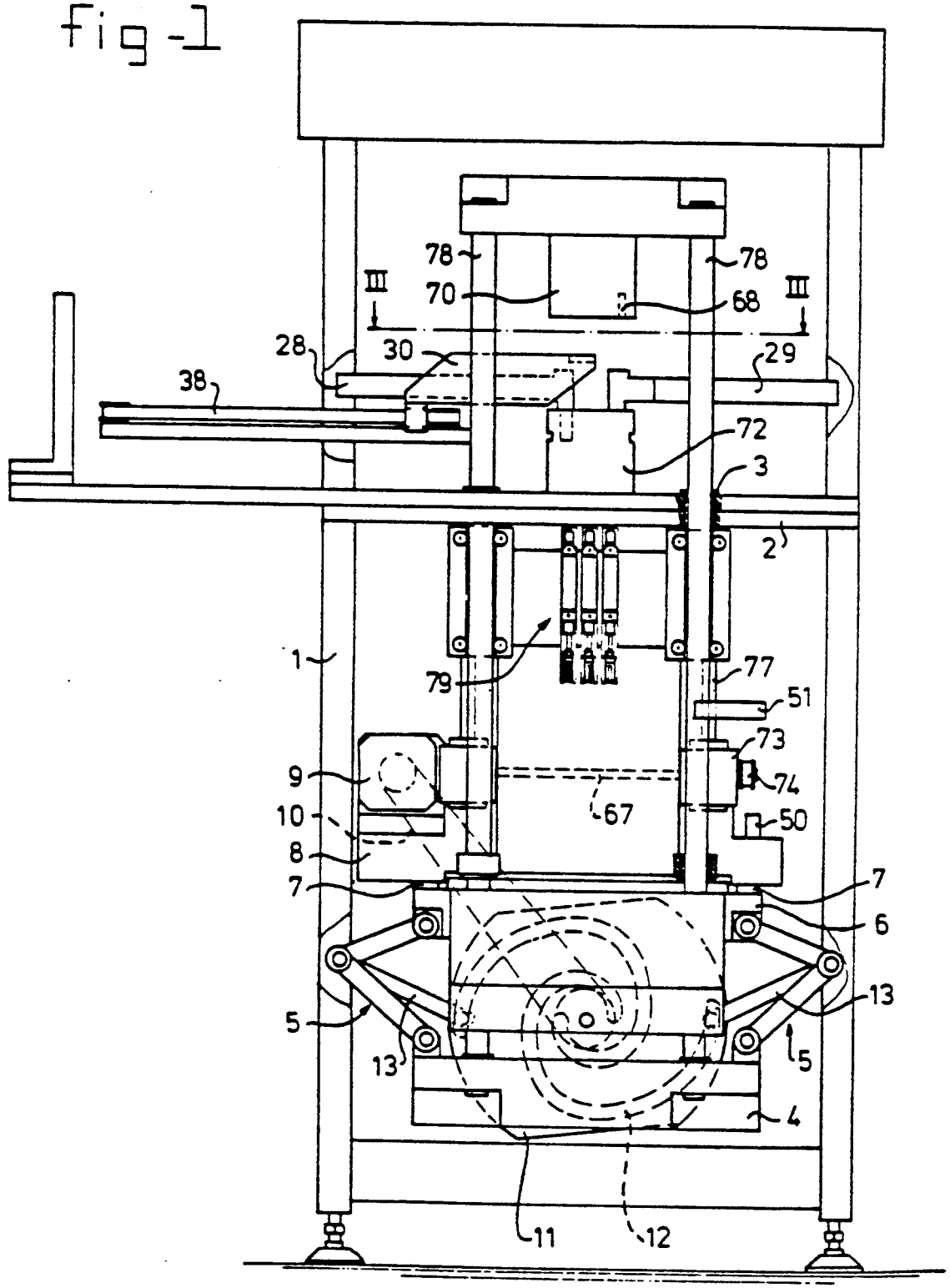
FIG. 1 diagrammatically shows a front view of the moulding press according to the invention, in the open position.
Figure 2:
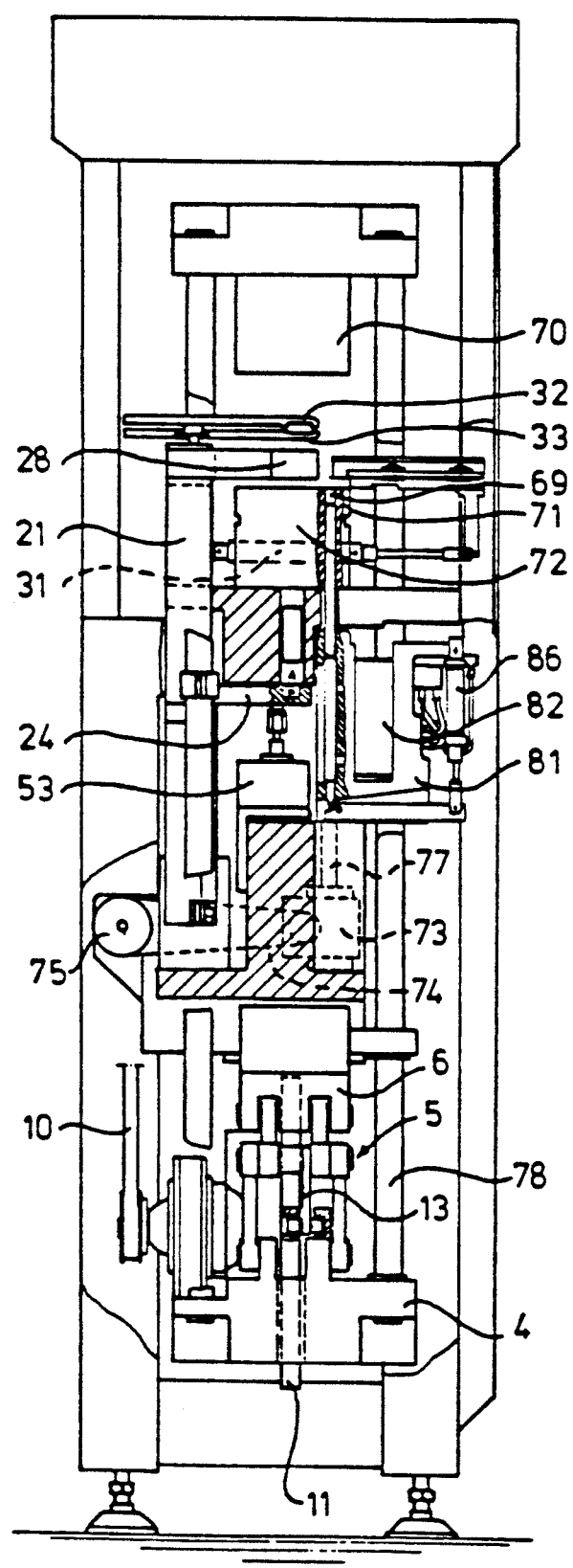
FIG. 2 shows a side view of the device according to FIG. 1, in the open position.
Figure 5:
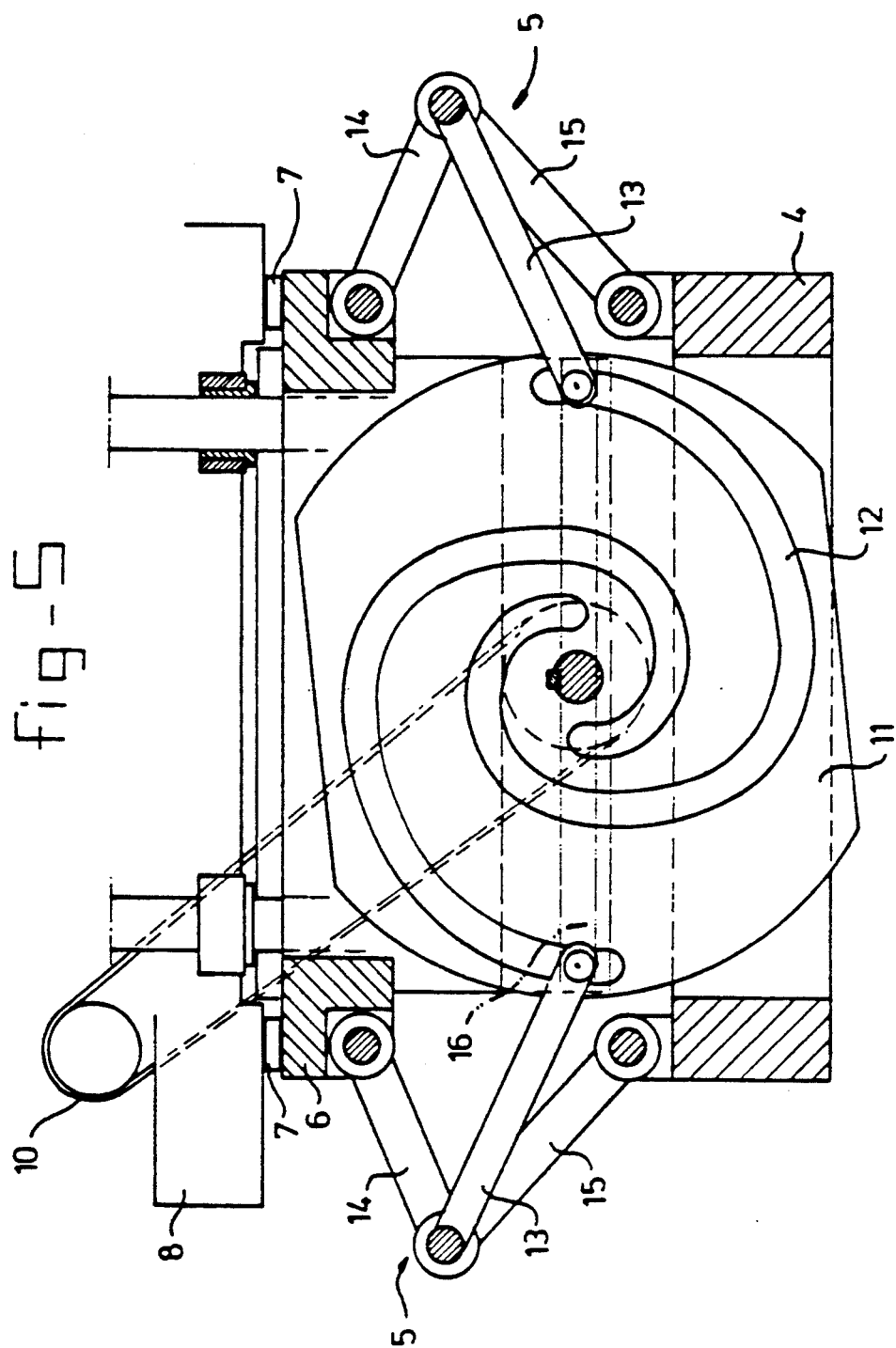
FIG. 5 shows a detail of the opening and closing mechanism of the moulding press.

The press device according to the invention comprises a frame 1, as shown in FIGS. 1 and 2. A cross plate 2 is provided in frame 1, onto which cross plate 2 a lower mould 72 is fitted in a fixed manner. Provided in cross plate 2 are guide bores 3, through which tie bars 78 are guided so as to be slidable to and fro. A carriage 79 is guided on the tie bars 78 in a slidable manner. Control of the carriage 79 is effected by a lead screw 77. On carriage 79 is fitted the moulding part of the device, which part will be described in more detail below. Tie bars 78 are connected on one side to the upper mould 70 and, on the other side, to the lower plate 4. The lower plate 4 is connected via a joint lever mechanism 5 to upper plate 6, which upper plate 6 is connected, via pressure sensors 7, to the carrying plate 8 which, together with cross plate 2, is firmly connected to frame 1. Motors 9 and 75 are fitted on carrying plate 8. Sensor 50, of carrying plate 8, is arranged to co-operate with protruding part 51 which is mounted on bar 78. Motor 9 is linked to a cam disc 11 via a transmission 10, an arm 13 of the joint lever mechanism 5 engaging on the cam tracks 12 of said cam disc. This arrangement is shown more clearly in FIG. 5. As can be seen in this figure, in addition to arm 13, arms 14 and 15 are also present. In addition to being guided in the cam tracks 12, the arms 13 are guided in a horizontal guiding groove 16 which is firmly connected with upper plate 6. As a result of their combined guiding in the cam tracks 12 and the horizontal guiding groove 16, the fastening points of the arms 13 at the cam disc can only carry out a reciprocating movement in the horizontal plane of FIG. 5 when the cam disc 11 rotates.

The moulding part of the device operates as described below.

When the motor 9 is driven, which motor 9 is a motor of the type which can deliver a considerable moment even during idling, the cam disc 11 will rotate. Starting from the position shown in FIGS. 1 and 5 and assuming that motor 9 rotates anti-clockwise, the arms 13 which are in the horizontal guiding groove 16 will be moved towards each other, i.e. towards the center of the cam disc, by means of the cam tracks 12. As a result thereof the arms 14 and 15 are moved apart and consequently the lower plate 4 moves down relative to the fixed carrying plate 8. A special course of the movement can be achieved by a simple design of the groove 12. During the first part of the closing movement, the motor 9 is controlled in such a manner that it delivers a relatively low moment. Therefore, if the two halves of the mould for some reason cannot be closed completely (if an object to be encapsulated has been inserted the wrong way round), this will not result in damage, but the closing movement will be brought to a halt. In this case, pre-tensioned spring constructions, such as are being used in the state of the art, are undesirable. After the closing movement has stopped at the relatively low torque, sensor 50 and protruding part 51 are used to determine whether the mould halves are positioned one on top of the other. Should this not be the case, an alarm signal is emitted. If correct positioning is confirmed, the motor is controlled in such a way that it delivers a higher torque during idling and thus the closing force exerted on the mould halves is sufficient to overcome the transfer and hardening pressure. In this case, the arms 14 and 15 are preferably virtually in the vertical position, whereby maximum transmission is provided between the motor 9 and the force exerted on the upper mould 70. After moulding has finished, the upper mould 70 may be moved away from the lower mould by driving the motor 9 in the opposite direction.

Figure 3:
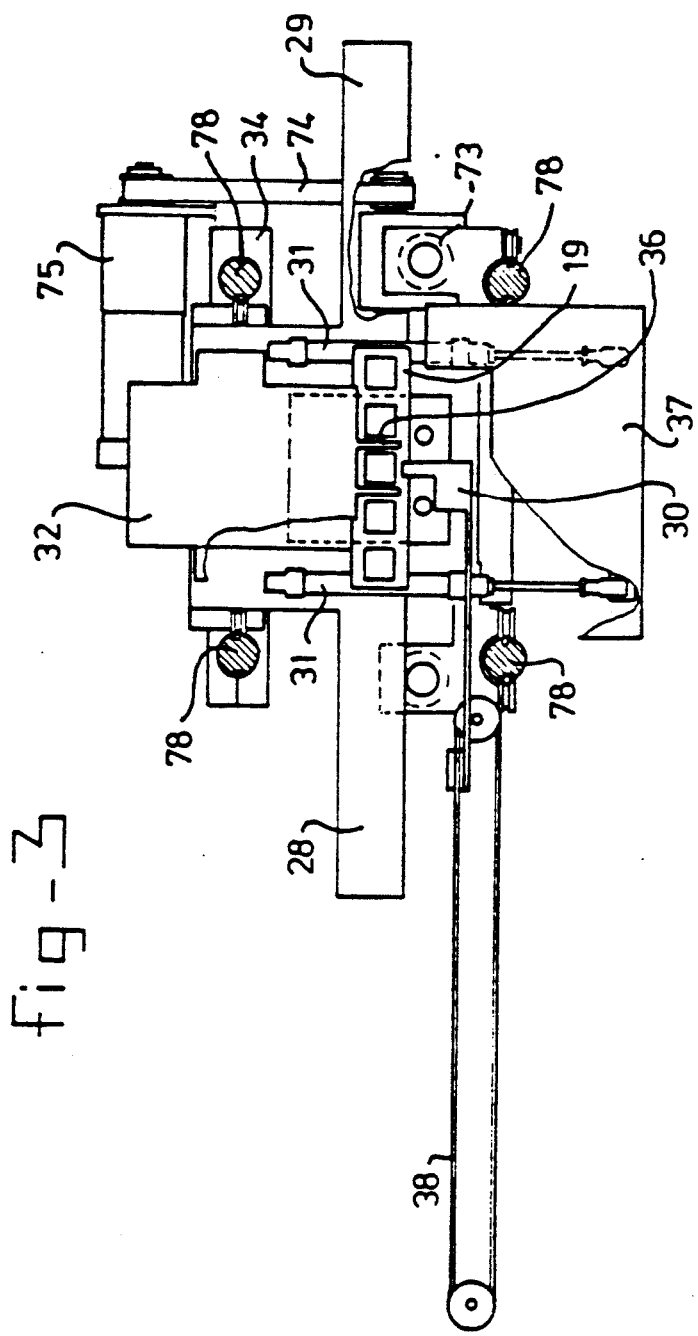
FIG. 3 shows a cross section along the line III—III of FIG. 1.
Figure 4:
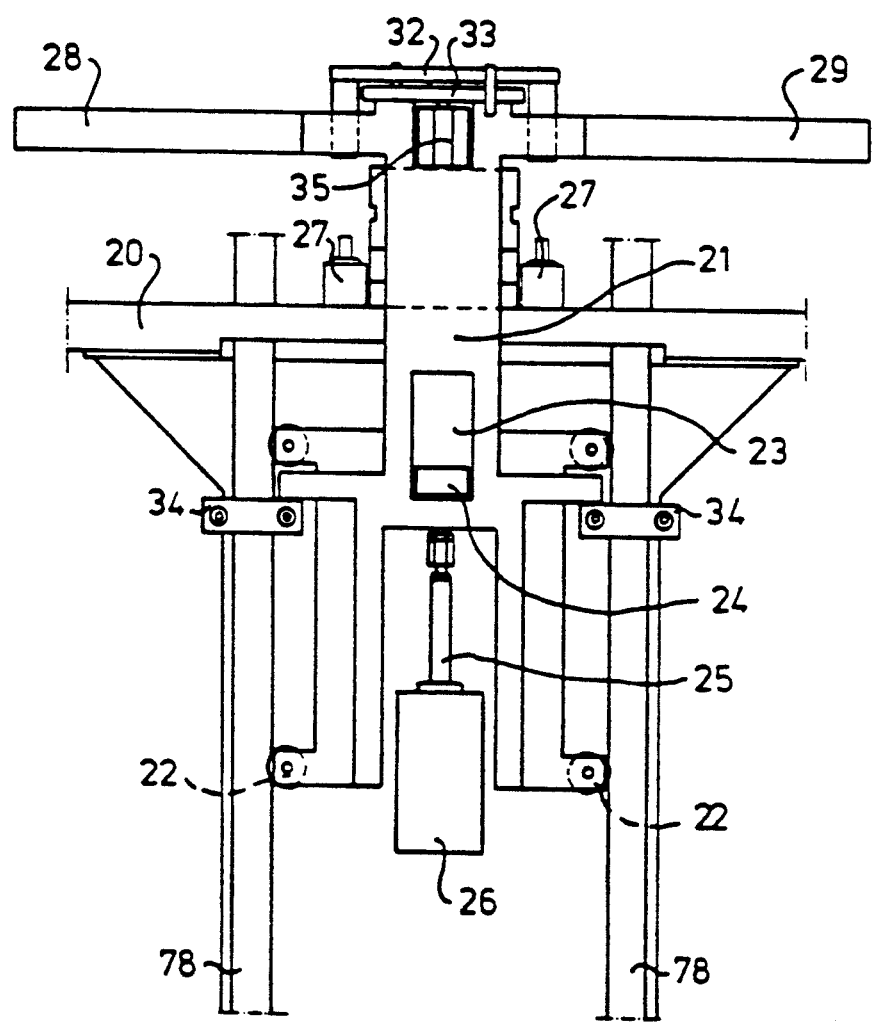
FIG. 4 shows a side view of a detail of the feed and discharge system for lead frames in the mould.
Figure 7:
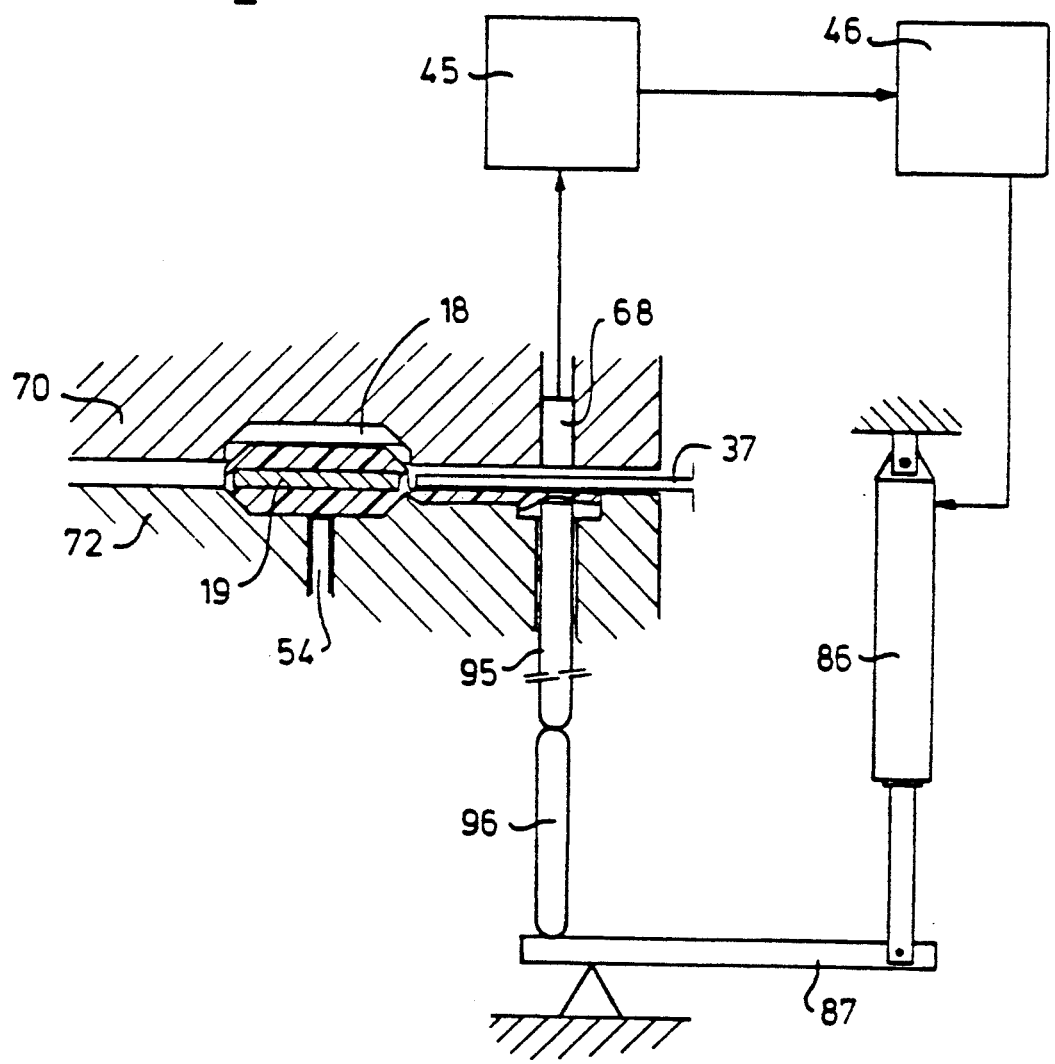
FIG. 7 shows a detail of the upper and lower mould and a diagrammatic illustration of a closed loop for the control of the moulding pressure.

When the mould halves 70 and 72 are being closed together, a so-called lead frame 19 must be present in the mould cavity which is denoted overall by 18 in FIG. 7, which lead frame contains an integrated circuit (not shown). With regard to the supply of said lead frame, particular reference is made to FIG. 3 and 4, which show that two stops 34 and a supporting plate 20 fastened thereto are connected to bars 78. A carriage 21 which, as can be seen in FIG. 4, rests on stops 34, is guided slidably by means of rollers 22 on bars 78. An aperture 23 is provided in carriage 21, in which aperture a stop 24 connected to an ejection device 54 (FIG. 7) is present. The dimensions of aperture 23 and stop block 24 are adapted to one another in such a way that the carriage 21 can travel half the complete stroke of the upper mould. Carriage 21 is connected to the piston rod 25 of air cylinder 26 which, as is shown in FIG. 2, is firmly connected to carrying plate 8. Cylinders 27 are present on carrying plate 8 or cross plate 2 or supporting plate 20, which cylinders act on an upper gripper 32. At its upper side, carriage 21 is fitted with arms 28 and 29. A gripper cylinder 35 is provided in the carriage 21, which gripper cylinder 35 acts, on the other side, on an upper gripper 32 which co-operates with lower gripper 33 (see also FIG. 2). Upper gripper 32 is equipped with gripper fingers 36 (FIG. 3). Lower gripper 33 is likewise equipped with fingers (not shown) for gripping lead frame 19. Drive cylinders 31 are provided for moving degate plate 37 (cf. FIGS. 3 and 7) to and fro. A conveyor belt 38 and a conveying plate 30 are firmly attached to arm 28 of carriage 21 in a manner not shown in further detail, i.e. they move along with upper mould 70. Conveying plate 30 is designed to engage on the lead frame 19. The operation of the abovementioned conveying mechanism is described below.

When the upper mould half is in the completely open position, the arms 28 and 29 are in the position shown in FIG. 4. During this state, the conveying of the lead frame is effected by means of the conveying plate 30 and belt 38. After the lead frame has been inserted in the grippers 32, 33, the arms 28, 29 will move down towards the supporting plate 20 together with the upper mould when this is moved downwards. In this case, the conveying plate moves along in a vertical direction and is able to move back in a horizontal direction. During the downward movement, the upper and lower grippers are closed in order to hold the lead frame between them. Gripper 32 abuts cylinders 27 (which extend) before aperture 23 abuts stop 24. The upper gripper 32 stays behind until aperture 23 abuts stop 24, as a result of which the lead frame can position itself in lower mould 72, as shown diagrammatically in FIG. 7. The upper side of the groove 23 comes to bear against stop 24 when approximately half of the downward stroke performed by upper mould 70 has taken place. The grippers have now brought the lead frame into the correct position in the lower mould 72.

In this arrangement, means are present in the upper and/or lower mould to accommodate the gripper fingers 36. When the mould is being closed, the gripper fingers are free and lead frame 19 is brought into position by the centring means (not shown). Subsequently, material is forced into the mould cavity, as will be explained in more detail below. At that stage, the degate plate 37 is not located between the mould halves 70 and 72, i.e. in FIG. 7 it has been moved from the area of the parting line between the mould halves by the drive cylinders 31. After the material has been introduced into lead frame 19, the upper mould half 70 moves upwards again, the now encapsulated part remaining in the mould cavity of the lower mould 72. During this upward stroke, degate plate 37 moves into the position, shown in FIG. 7, between the upper mould half 70 and the lower mould half 72. Shortly before the carriage 21 is taken along by stop 34, the cylinders 27 and 35 retract so that the grippers engage on the lead frame. The cylinder 26 is driven outwards in such a way that it pulls on carriage 21. Cylinder 53 which controls stop 24 is driven outwards in the same way. Cylinder 26 thereby prevents cylinder 53 from moving upwards. This state is maintained during the first half of the opening stroke. The grippers retain their grip on the lead frame.

During the second half of the opening stroke, the carriage 21 is taken along upwards by the stops 34. Stop 24 and thus the ejection mechanism 54 follow the upper side of aperture 23 because the stops 34 override the action of the cylinder 26.

Thus the closed grippers 32 and 33 and the ejection mechanism 54 travel upwards in a synchronous manner via stop 24, and the sprue remnants are broken off the product and held in the lower mould 72. As a result of breaking off the sprue at the moulding temperature, the bond with the lead frame is relatively weak, so that a perfect finish can be obtained using relatively little force and without risk of damage to the lead frame or the capsule of the integrated circuit.

Subsequently, the arms 28 and 29 move away from the supporting plate 20 and move along upwards with the upper mould 70, the lead frame being gripped by the grippers. At the end of the movement stroke of the upper mould, the vertical conveying of the lead frame 19 is repeated in the manner described above and the encapsulated part in FIG. 3 is moved one position to the right.

The device for introducing plastic material under pressure into the mould cavity will be described in more detail with reference to FIG. 2 and FIG. 6. This device comprises a carriage 79, which carriage 79 is guided slidably in tie bars 78. Motor 75 is connected to the stationary part of the device and drives gearboxes 73 via transmission 74 and rod 67. Gearbox 73 in turn drives lead screw 77 with which carriage 79 can be moved upwards and downwards (not shown in more detail). The motor 75 is of such design that it regulates the movement of the plunger over its entire speed range in a controlled manner.

Figure 6:
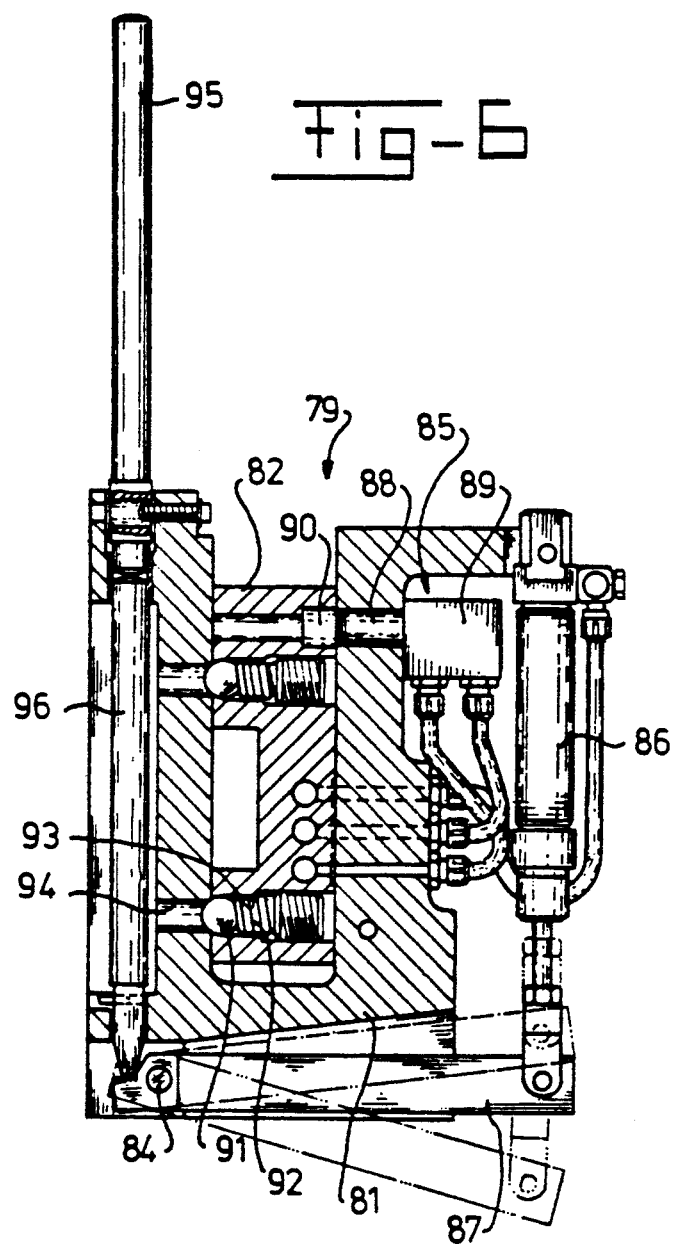
FIG. 6 shows a detail of the press plunger for injecting plastic into the mould cavity.

FIG. 6 shows that carriage 79 comprises a first support 82 and a second support 81. The lead screw 77 acts on the first support 82. The drawing shows that the second support 81 is fitted around the first support. Bores 93 are provided in the first support 82, which bores accommodate the balls 91 loaded with springs 92, which balls drop into corresponding bores 94 of the second support 81. In addition, a piston-cylinder assembly 88, 89 is attached to the second support 81, while a bore 90 has been provided in first support 82. Piston-cylinder assembly 88, 89 (i.e. locking means 85) can be controlled by means of air hoses connected thereto, which air hoses are attached to a control device (not shown in more detail). An air cylinder 86 is also fitted on second support 81, the reciprocating part of which cylinder acts on a lever arm 87 which acts, via a substantial lever transmission, on thrust rod 96 which in turn acts on press plunger rod 95 which is accommodated in lower mould 72 containing a heater 71 (not shown in more detail).

FIG. 7 diagrammatically shows a part of the upper and lower mould and indicates more clearly that pressure sensor 68 is connected to the comparing means 45 where the desired value for the present product is stored. Comparing means 45 act on control means 46 which in turn act on air cylinder 86.

The part of the device described above works as follows:

After the upper mould 70 has been closed onto the lower mould 72, a lead frame containing an integrated circuit having been accommodated in the mould cavity and a plastic material having been introduced in bore 69, said plastic material is rendered fluid by the heater 71 and the press force. As a result of driving the motor 75, the first and second support, i.e. carriage 79, move upwards and air cylinder 86 is in the extended activated position. By variation of the height of the pallets, the vertical position of 95 and 96 will also vary. As a result, the position of 86 will also be able to vary in the idling phase. The extreme positions are indicated by dotted lines and broken lines, which position is always unknown. Under these conditions, the plunger rod 95 will travel the relatively long transport path at a relatively low pressure. In order to prevent damage to the connection between the integrated circuit and the lead frame, it is important that the fluid flow should not become too large during this first phase. During the upward movement, the locking means 85 are in the unlocked position, i.e. the piston 88 is outside the aperture 90. If, during this upward movement, the pressure should, for any reason, exceed a set threshold value which is much lower than the final moulding pressure, but higher than the normal filling pressure, the force with which springs 92 force balls 91 into bore 94 will be overcome as soon as that set value is exceeded. In this case, the first support 82 continues its movement whereas the second support 81 stays behind. Moreover, at the same time, the air supply to the locking means 85 and air cylinder 86 is interrupted so that these can no longer be operated. An overload protection of this kind has the advantage that an on/off state is provided. That is to say, the protection system is either active or inactive and if it is inactive, it has no effect on the overall functioning of the device. In addition, the protection system can easily be replaced.

If protection is not required, pistion 88 will be moved out of cylinder 89 when the end of the transport or transfer stroke is reached, i.e. the locking means 85 interlock the first and second support, as a result of which the securing means 84, consisting of the spring-loaded balls, are not activated when a given pressure is exceeded. Furthermore, motor 75 is switched off. Subsequently the much higher final pressure has to be generated, which is achieved by means of air cylinder 86. Since the plastic is essentially incompressible and there is still a small amount of gas present, the generation of the final moulding pressure may be regarded as a static process. The generation of the final moulding pressure can be achieved independently of the position of the air cylinder 86. The position of arm 87 is dependent on the amount of plastic introduced. During application of the pressure for hardening, there is essentially no movement of the arm 87. This relatively high moulding pressure may be generated by a combination of the air cylinder 86 and the lever ratio of lever 87. This force is sufficient as the final pressure and is independent of the securing means 84. This is contrary to the state of the art where various spring constructions are used and the spring force has to be overcome to apply the final pressure, as a result of which it is not possible to determine the final pressure in an accurately controlled manner. The pressure is measured constantly with the aid of the sensor 68 which is located in the upper mould (FIG. 7). The signal originating from this sensor is compared in comparing means 45 with the desired value stored in the memory of said means. In dependence on the outcome of this comparison, the control means 46 are operated to supply a higher, lower or unchanged pressure to the air cylinder. Said control may be carried out by electronic means as well as by completely pneumatic means.

It is also evident from FIG. 6 that the plunger comprises a plunger rod 95 and a thrust rod 96. Construction of the plunger in several parts means that, when the press plunger rod 95 is damaged, only this part and not the thrust rod in the carriage 79 needs to be replaced. Said construction and the replacing may be effected with the aid of a simple securing construction, as shown in FIG. 6. Supplying the pressure in two stages by two separate means gives the advantage that very effective means can be constructed for protection at low pressure, while the high-pressure mechanism can be of relatively simple construction. It is obvious that these two separate movements can be achieved by other means. Thus it is possible to effect the first part of the stroke by means of an air cylinder which applies a relatively controlled speed to the plunger rod 95.

I claim:

1. A moulding press for a moulding device, said moulding press comprising:
    an upper mould half and a lower mould half, said upper mould half being movable with respect to said lower mould half between a mould open position and a mould closed position, said upper mould half being movably connected to tie bars, said tie bars being connected to an upper plate and a lower plate, a connection between said upper and lower plates including two arms pivotally connected to each other and having free ends which are pivotally connected to said upper and lower plates, respectively, a first end of at least one control arm engaging a pivotable point of said two arms and a second opposed end of said control arm engaging on a cam track of a cam disc, said cam disc being mounted rotatably on a frame of said moulding press, means for rotating said cam disc wherein rotation of said cam disc moves said at least one control arm between a first position and a second position, whereby when said at least one control arm moves into said first position, said arms move said lower plate into a retracted position thereby moving said tie bars in a first direction so that said upper and lower moulds are in said mould open position and when said at least one control arm moves into said second position said arms move said lower plate to an extended position thereby moving said tie bars in a second direction so that said upper and lower moulds are in said mould closed position.

2. A moulding press according to claim 1, in which one of said mould halves is connected to said frame.

3. A moulding press according to claim 1, in which the movement effected by said cam track brings about a relatively quick closing movement when said mould halves are at a considerable distance and a relatively slow movement when said mould halves are at a position closer than said considerable distance.

4. A moulding press according to claim 1, in which said cam disc is designed to apply a force on said control arm during idling of said means for rotating said cam disc.

5. A moulding press according to claim 1, in which said cam disc is driven by a motor which can deliver a moment during idling of said motor.

6. A moulding press for a moulding device, said moulding press comprising:
    an upper mould half and a lower mould half which can be moved relative to each other between a mould open position and a mould closed position;
    a first plate coupled to one of said mould halves and a second plate coupled to a frame of said moulding press;
    a connection between said upper and lower mould halves comprising a pair of spaced joint linkages, wherein each said joint linkage includes two arms pivotally connected to each other and which are pivotally connected to said first and second plates, respectively;
    at least one control arm with a first end which engages a pivotable point of said two arms and a second opposed end of said control arm engaging on a cam track of a cam disc;
    said cam disc being mounted rotatably on said frame of said moulding press;
    wherein said two spaced-apart joint linkages are provided on opposite sides of said cam disc wherein said second opposed end of said control arm engages a linear guiding groove, which said guiding groove extends essentially perpendicular to the direction of movement of said upper and lower mould halves.

7. A moulding press as claimed in claim 6, in which one of said mould halves is connected to said frame.

8. A moulding press according to claim 7, in which the movement effected by said cam track brings about a quicker closing movement when said mould halves are at a considerable distance than the movement of said mould halves when said mould halves are closer together.

9. A moulding press according to claim 8, wherein said cam disc is designed to apply a force on said control arm during idling of said moulding press.

10. A moulding press according to claim 9, wherein said rotating cam disc is driven by a motor which can deliver a moment to said cam disc during said idling of said motor.

11. A moulding press according to claim 6, in which the movement effected by said cam track brings about a quicker closing movement when said mould halves are at a considerable distance than the movement of said mould halves when said mould halves are closer together.

12. A moulding press according to claim 11, wherein said cam disc is designed to apply a force to said control arm during idling of said moulding press.

13. A moulding press according to claim 12, in which said rotating cam disc is driven by a motor which can deliver a moment to said cam disc during said idling of said motor.

14. A moulding press according to claim 6, in which said cam disc is designed to apply a force on said control arm during idling of said moulding press.

15. A moulding press according to claim 14, wherein said rotating cam disc is driven by a motor which can deliver a moment to said cam disc during said idling of said motor.

16. A moulding press according to claim 6, in which said rotating cam disc is driven by a motor which can deliver a moment to said cam disc during idling of said motor.

* * * * *